United States Patent
Mostert et al.

(10) Patent No.: US 12,063,907 B2
(45) Date of Patent: Aug. 20, 2024

(54) MILKING SYSTEM

(71) Applicant: LELY PATENT N.V., Maassluis (NL)

(72) Inventors: Gerard Mostert, Maassluis (NL); Rik Steenbergen, Maassluis (NL); Frans Emo Diderik Van Halsema, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 278 days.

(21) Appl. No.: 16/467,701

(22) PCT Filed: Nov. 27, 2017

(86) PCT No.: PCT/NL2017/050779
§ 371 (c)(1),
(2) Date: Jun. 7, 2019

(87) PCT Pub. No.: WO2018/111093
PCT Pub. Date: Jun. 21, 2018

(65) Prior Publication Data
US 2020/0000055 A1 Jan. 2, 2020

(30) Foreign Application Priority Data
Dec. 14, 2016 (NL) ..................... 2017995

(51) Int. Cl.
*A01J 5/013* (2006.01)
*A01J 5/01* (2006.01)
*A01J 5/08* (2006.01)

(52) U.S. Cl.
CPC ............. *A01J 5/0135* (2013.01); *A01J 5/01* (2013.01); *A01J 5/08* (2013.01)

(58) Field of Classification Search
CPC ........ A01J 5/0135; A01J 5/007; A01J 5/0131; A01J 5/01
See application file for complete search history.

(56) References Cited

U.S. PATENT DOCUMENTS 4,112,758 A * 9/1978 Heidecker ............. A01J 5/01
73/218
4,447,725 A * 5/1984 Biggs .................... G01N 21/31
250/339.12
(Continued)

FOREIGN PATENT DOCUMENTS

DE 3609275 A1 * 9/1987 ............. A01J 5/007
EP 0 511 723 A2 11/1992
(Continued)

OTHER PUBLICATIONS

International Search Report issued on Feb. 21, 2018, in PCT/NL2017/050779 filed on Nov. 27, 2017.
(Continued)

*Primary Examiner* — Joshua D Huson
*Assistant Examiner* — Spencer T Callaway
(74) *Attorney, Agent, or Firm* — Oblon, McClelland, Maier & Neustadt, L.L.P.

(57) ABSTRACT

A milking system for milking a dairy animal includes a milking cup and a measuring chamber which is in flow communication with the milking cup for the obtained milk where the chamber has a sensor system for measuring at least one property of the milk. The sensor system includes at least three optical sensor devices, each configured to measure values of a property of the milk, and a sensor control unit for actuating the sensor system and for processing the measured values. The sensor control unit is configured to repeatedly select one of the sensor devices. Two of the optical sensor devices are identical, and the sensor system is configured to in each case measure the local value of the property of the milk and to determine a value of the at least one property of the milk in the measuring chamber on the basis of the values measured locally.

20 Claims, 6 Drawing Sheets

(56) References Cited

U.S. PATENT DOCUMENTS

| | | | | |
|---|---|---|---|---|
| 4,756,274 | A | * | 7/1988 | Rubino ............... A01J 5/01 119/14.08 |
| 5,080,040 | A | | 1/1992 | van der Lely et al. |
| 5,743,209 | A | * | 4/1998 | Bazin ............... A01J 5/007 119/14.08 |
| 6,371,046 | B1 | * | 4/2002 | Petterson ............... A01J 5/007 119/14.02 |
| 7,236,237 | B2 | | 6/2007 | Schmilovitch |
| 8,446,582 | B2 | | 5/2013 | Pinsky |
| 10,398,123 | B2 | * | 9/2019 | Van Mourik ............ A01J 5/08 |
| 10,537,088 | B2 | * | 1/2020 | Meillan ............... A01J 5/01 |
| 2003/0065480 | A1 | | 4/2003 | Vijverberg et al. |
| 2006/0249082 | A1 | | 11/2006 | Holmertz et al. |
| 2007/0272159 | A1 | * | 11/2007 | Francke ............... A01J 5/007 119/14.14 |
| 2007/0289536 | A1 | * | 12/2007 | Dunn ............... A01J 5/0138 119/14.14 |
| 2010/0285523 | A1 | * | 11/2010 | Pinsky ............... G01N 33/04 435/39 |
| 2012/0012059 | A1 | * | 1/2012 | Arvidsson ............ A01J 5/0132 119/14.08 |
| 2013/0019806 | A1 | * | 1/2013 | De Groot ............... A01J 5/007 119/14.02 |
| 2014/0130745 | A1 | * | 5/2014 | Van Halsema .... G06K 9/00362 119/14.08 |
| 2015/0241336 | A1 | * | 8/2015 | Krief ............... A01J 5/0135 356/409 |
| 2016/0295133 | A1 | | 10/2016 | Rudmann | |

FOREIGN PATENT DOCUMENTS

| | | | | |
|---|---|---|---|---|
| EP | 1 000 535 A1 | 5/2000 | | |
| EP | 1 297 742 A2 | 4/2003 | | |
| EP | 0 871 858 B1 | 9/2006 | | |
| EP | 1 917 850 A1 | 5/2008 | | |
| EP | 2 727 460 A1 | 5/2014 | | |
| EP | 2 903 419 B1 | 11/2016 | | |
| GB | 2154007 A | * | 8/1985 | ............ A01J 5/01 |
| WO | WO-0119170 A1 | * | 3/2001 | ............ A01J 5/0133 |
| WO | WO 2005/072358 A2 | 8/2005 | | |
| WO | WO 2010/115826 A2 | 10/2010 | | |
| WO | WO 2018/111093 A1 | 6/2018 | | |

OTHER PUBLICATIONS

Aernouts, B. et al., "Visible and near-infrared bulk optical properties of raw milk", Journal of Dairy Science, vol. 98, No. 10, 2015, pp. 6727-6738.

Aernouts, B. et al., "Visible and near-infrared spectroscopic analysis of raw milk for cow health monitoring: Reflectance or transmittance?" Journal of Dairy Science, vol. 94, No. 11, 2011, pp. 5315-5329.

Cowsmopolitan Magazine, "Afimilk Introduces the Afilab Milk Analyzer at World Ag Expo". Dec. 28, 2015, 3 pages.

ICAR Overview of Recoding and Sensor Devices and Sampling Systems on Dairy Farms, 5 pages.

European Notice of Opposition filed in corresponding Application No./Patent No. 17817268.0-1005 / 3554226, dated Oct. 13, 2022.

\* cited by examiner

MILKING SYSTEM

BACKGROUND OF THE INVENTION

Field of the Invention

The present invention relates to a milking system for milking a dairy animal, comprising a milking cup for obtaining the milk, a measuring chamber which is in flow communication with the milking cup for at least temporarily containing the obtained milk, and having a sensor system arranged therein or thereon for measuring at least one property of the milk.

Description of Related Art

Milking systems having sensors for milk properties are known per se. For instance, U.S. Pat. No. 5,743,209 discloses a system for monitoring milk production at a dairy farm. The system comprises, inter alia, a milk meter 30 having a sample compartment 31, and an analysis compartment 33 in which is located an optical probe 34 for (infrared) analysis of a milk sample and an agitator for homogenizing the sample.

A drawback of this known system is that, on the one hand, it is limited or slow in measuring milk properties in practice, and on the other hand is of unnecessarily complex construction.

BRIEF SUMMARY OF THE INVENTION

It is an object of the present invention to provide a milking system of the type indicated, having a high measuring flexibility and/or measuring speed and/or low complexity.

The invention achieves this object by means of a milking system and, in particular a milking system for milking a dairy animal, comprising a milking cup for obtaining the milk, a measuring chamber which is in flow communication with the milking cup for at least temporarily containing the obtained milk, and having a sensor system arranged therein or thereon for measuring at least one property of the milk, wherein the sensor system comprises a plurality of at least three optical sensor devices, each configured to measure values of a property of the milk, which sensor devices are in particular in a row, and a sensor control unit for actuating the sensor system and for processing the measured values, wherein the sensor control unit is configured to repeatedly select one of the sensor devices in a targeted manner, wherein each sensor device is selectable, wherein at least two of the optical sensor devices are identical, wherein the sensor system is configured to in each case measure the local value of the property of the milk at the location of the selected sensor device using the selected sensor device, and to determine a value of the at least one property of the milk in the measuring chamber on the basis of the values measured locally by the plurality of sensor devices.

The invention is based on the insight that it is, for example, not necessary to provide an agitator in order to obtain high-quality measurements. The milking system is therefore in particular free of homogenization means in the measuring chamber. The property to be measured may namely be measured alternatively in the volume of milk at a plurality of locations, using the at least two sensor devices. It is thus also possible to obtain a value which is representative of the volume of milk by means of averaging or another mathematical operation. In this case, "identical sensor device" is understood to mean that the sensor devices measure substantially the same property in substantially the same way, and in principle are mutually interchangeable.

The advantages of omitting the agitator are, inter alia, that the system is mechanically less complex, or at least needs fewer or no moving parts, that the milk quality is not negatively affected by possible mixing with air or mechanical load on, in particular, the milk fat globules, and that the measuring chamber does not have to be limited to sampling but can also be used in-line.

It should be stressed here that the sensor devices of the sensor system, or at least the identical sensor devices, are each in themselves able to measure a value of the milk property, and specifically in each case a local value of the milk property, at the location of the selected sensor device. The sensor control unit subsequently determines the/a value of the property of the entire milk in the measuring chamber on the basis of the values of the milk property locally determined by a plurality of the sensor devices, for example as described above using a mathematical operation. Such a system differs from a system in which different sensors each determine a measured value which is not directly converted to a value of the milk property, but in which the system can only determine this milk property value by processing all measured sensor values. For example, it is thus not possible to determine a spread in the values of the milk property over the milk in the measuring chamber, meaning that it is also not possible to reach a conclusion about homogeneity, separation and the like. In addition, it is even possible in this case, if desired, for a milk property value not to be determined locally, such as at the bottom of the milk, or in fact in a top layer. All of this is indeed the case in the present invention.

It is also possible in the present invention to carry out redundant measurements, such as by selecting different sensor devices which should in principle emit the same value, such as sensor device at the same height in the milk. As a result, it is possible to correct deviations caused by, for example, soiling of one of the sensor devices on the basis of the other measurements. Measurements of the milk in the measuring chamber can thus be made more reliable and/or even more reliable.

Particular embodiments are described in the following description.

The sensor devices are in particular in a row, and more particularly in a row which extends substantially vertically during milking. In this case, "substantially" means that the angle from the vertical, which could vary during milking, is at most 25°, so that a deviation on the basis of the cosine of the angle is at most 10%. A smaller maximum angle will of course lead to a smaller deviation. Incidentally, it is also possible to arrange one or more sensor devices not along such a vertical line, but for example along a horizontal line, along any other line or even any other distribution. After all, the advantage of measuring in other parts of the milk is thus maintained.

In embodiments, the optical sensor devices are distributed over the measuring chamber, in particular over the height of the measuring chamber. In this case, the "height" should be interpreted as being in a vertical direction during use. It is thus possible in an optimum manner for the milking system to take measurements at a plurality of locations in the milk in the measuring chamber. In this case, it may be advantageous to arrange the sensor devices such that they are distributed (also) in a horizontal direction, for example if the milking chamber has a milk discharge on one side during normal use. In the case of a distribution (also) over the height, it will always be possible to carry out measurements which may entirely or partly compensate for a consequence of potential sagging under the influence of gravity.

In embodiments, the optical sensor devices are all identical sensor devices. This ensures that all measurements are also readily comparable. Incidentally, it is not necessary for all optical sensor devices to be identical. For example, one or more sensor devices could be configured to measure another variable, such as for another wavelength.

In embodiments, one or more of the optical sensor devices each comprise a plurality of optical sub-sensors. This is understood to mean that the relevant optical sensor devices contain a composite sensor having, for example, a plurality of light-sensitive elements, which together function as one unit. Precisely because it is simple to configure optical sensors and their light-sensitive elements to be very compact, providing such composite sensor devices does not lead to a lack of space, but does lead to a plurality of usable data, both in terms of variety in, for example, wavelength but also due to the spatial distribution of the sensor devices. In particular, the optical sensor devices each are or comprise an RGB chip or RGB-IR chip. These are chips with respectively three or four types of light-sensitive sensors (red, green, blue, infrared, with in each case a suitably selected wavelength range and/or peak wavelength). This is comparable to a picture element of an (I)RGB camera. Of course, a plurality of such RGB chips or picture elements may also be provided, preferably in an array.

In embodiments, the sensor system further comprises at least one light source, in particular at least one light source for each optical sensor device. These may all, for example, be arranged on a single substrate, for example a planar substrate, as a result of which this system may effectively carry out reflection measurements. Advantageously, the at least one light source and the sensor devices are placed in or on the measuring chamber in such a way that at least a part of the milk in the measuring chamber is located between the light source(s) and the sensor devices. The system is thus suitable for performing transmission/absorption measurements, as well as reflection measurements. For example, the light source(s) and the sensor devices are each placed on a side of the measuring chamber, which in this case is made of a translucent or transparent material. The light source(s) and the sensor devices may also be placed in the wall of the measuring chamber, or in the measuring chamber itself, thus in the milk. In advantageous embodiments, the light sources and the sensor devices are provided on two or more substrates, with each substrate comprising one or more light sources and one or more sensor devices, more advantageously in an alternating pattern, such as a checkerboard pattern. In particular, at least two substrates are elongate, with a longitudinal direction, and the at least two substrates extend at an angle between their longitudinal directions, in particular a right angle. In this case, there is the advantage that a great many different path lengths are then available between the different sensor devices and the light source(s). All such embodiments contribute to the possibility for the milking system to use machine learning to process the measured values into values of one or more milk properties.

In particular, the at least one light source is a broadband light source. This is understood to mean that the emitted light comprises far more than one "color" (of the seven main colors), in particular has an FWHM of at least 100 nm, more particularly comprises "white" light, which can continually be composed from a plurality of sub-colors which overlap. Incidentally, in this application "light" should be understood to include both visible light and near infrared (0.75-1.4 μm).

Such broadband light sources are, for example, certainly LEDs, such as white-light LEDs.

In embodiments, the first milk property which is not the height is or comprises a color or absorption spectrum of the milk. Optical measurements are suitable for determining other parameter values, including on account of their high information density. In particular, the second milk property is or comprises a color or absorption spectrum of the milk. Advantageously, the sensor control unit is configured to determine a milk composition or part thereof on the basis of these values. For example, the sensor control unit may be configured to conclude that the milk is so-called blood-containing milk if the proportion of red in the absorption spectrum exceeds a predetermined threshold, or the color is otherwise designated as "red", such as by a reflection value above a reflection threshold in the red part of the spectrum. It is also possible to obtain an indication of a fat and/or protein content, as is known per se from the prior art. In the case of non-homogeneous milk in the measuring chamber, the present invention may take a more accurate and more reliable measurement of, for example, fat content on the basis of the different local measurements.

In alternative embodiments, the second milk property is or comprises the occurrence or concentration of flakes and/or other particles in the milk which satisfy a predetermined optical criterion. Such flakes are an indication of clinical mastitis, as a result of which the milk cannot be intended for human consumption. Automatic detection, such as is possible using the invention, may promote taking early action against the agents causing this deviation. Determining the occurrence of such flakes is readily possible using the optical sensor devices of the present invention, owing to the properties of light. For example, flakes will absorb a greater amount of the light striking them than the milk itself, meaning that extra absorption of light compared to the direct surroundings can be considered to be a flake. Precisely because it is possible to take local measurements in the present invention, it is readily possible to carry out such comparisons and detections. Furthermore, it is possible to distinguish air bubbles from flakes. Of course, air bubbles do not indicate mastitis, and if it is not possible to distinguish between air bubbles and flakes this will result in many false-positive detections. In this case, the invention uses the insight that air bubbles do not or hardly absorb light, but do scatter it, which scattered light may be detected using suitably placed sensor devices. And the transmission may even increase somewhat in the case of light which passes straight through the air bubble. In these cases, the sensor control unit is advantageously correspondingly configured to carry out the detections described. In addition, the sensor control unit is advantageously configured to follow detected particles, which is known as "tracking". Each time a deviation is detected in, for example, absorption value or another parameter value, either an air bubble or a flake is detected. This detection is more reliable if the deviation moves in the intended flow direction of milk in the measuring chamber, such as toward a milk discharge opening. If such a movement is not, or is insufficiently reliably, detected, the sensor control unit deduces that there is "no particle". If the movement is detected, but specifically if a peak is detected in scattered light or the transmission, the sensor control unit deduces that there is an "air bubble", or at least "no flake". If both a movement is detected and a period of time of the optical parameter value which is associated with a flake, the sensor control unit deduces that there is a "flake". Such detected flakes may be counted, and if a threshold value or threshold concentration is exceeded, the sensor control unit may emit an alarm, and the milking system may select another destination for the milk.

An important observation regarding the present invention is that it does not relate to a system based on cytometry, in which milk is guided through a capillary tube in order to detect and count the milk cells and particles. Not only is such a system totally unsuitable for an in-line application, but it is also a very complex and sensitive system. Another significant drawback is that, owing to the milk being guided through a capillary tube, it takes a very long time before a somewhat relevant volume of milk has been measured, even of a milk sample. In the present invention, there is always a measuring chamber with a content of at least a plurality of $cm^3$.

In embodiments, the sensor system is also configured to measure the height of milk in the measuring chamber, wherein the sensor system is configured to determine the height depending on the values measured by the sensor devices and on the height of the sensor devices in the measuring chamber. It is simple to measure the height using the invention, for example by looking at the height of the highest sensor device which emits a transmission value for light which is lower than a predetermined threshold value, in particular because milk (foam) is located in front of the sensor device and light is thus absorbed. On the basis of the height, it is possible to determine, for example, a milk volume or milk flow. If the measuring chamber does not have a milk discharge opening but does have a known form, the milk volume may be determined directly from the height. If the measuring chamber has a milk discharge opening, the milk outflow speed will depend on the height of the milk above said opening, and on values such as the cross-sectional area and flow resistance. Nevertheless, it is possible in a relatively easy manner, on the basis of hydrostatic calculations or practical tests, to determine which milk flows is associated with which height value, if desired including a progression over time of said height value. Furthermore, it is important for some parameters, such as in particular a (vacuum) pressure level, to know how high the level of the milk in the measuring chamber is.

In embodiments, the measuring chamber further comprises a milk discharge opening and a valve device having a controllable passage opening and a valve control unit for controlling the valve device, wherein the valve control unit is operatively connected to the sensor control unit and is configured to control the passage opening on the basis of the measured value of the height. In particular, the valve control unit is configured to keep the height of the milk in the measuring chamber constant as far as possible. In these embodiments, the milking system is able to control the height somewhat to well, or even keep it the same as far as possible. As a result, other parameter values will often also remain the same, such as said (vacuum) pressure. Milk flow calculations may also be calculated in a simpler way using the passage area of the milk discharge opening. To this end, in particular, a valve state monitor is provided which transmits the valve state to the sensor control unit.

It has also been found in practice that there is less foam and film formation of the milk in the measuring chamber if the milk remains at (approximately) the same level for a time. This makes the measurements even more reliable, "cleaner", so to speak.

In addition, the sheer amount of data, such as from the different locally measured values of the milk property, makes it more readily possible to improve the processing of data using machine learning. Therefore, the sensor control unit is in particular configured to use machine learning to process the measured values into at least one value of a milk property, in particular at least one content of a component of the milk. In this case, machine learning involves at least a change in a processing algorithm which processes the measured values into values of a milk property.

In embodiments, the sensor system comprises a temperature sensor. This makes it possible to correct the measured values for temperature differences. In general, the milk temperature itself will be relatively constant, but if, for example, the ambient temperature is very low or very high, this may already have an impact on the milk temperature, and thus on the electrical properties which are measured. The temperature sensor is not subject to any particular limitations, and comprises, for example, a separate electrode.

In embodiments, the measuring chamber is rigidly connected to the milking cup, in particular connected thereto in a unitary manner. In these embodiments, the measuring chamber is located very close to, to directly at, the outlet from the milking cup. It is thus possible to obtain measured values, and thus values of the milk property or milk properties as quickly as possible, so that action on the basis thereof can also be taken as quickly as possible. In this case, it may be advantageous, for example, if the milking system is configured to detect the first milk jets (pre-milk jets). This may constitute a check for whether the milking cup has been correctly attached to the teat. After all, these milk jets are a confirmation of correct attachment, whereas the absence thereof after a threshold time indicates incorrect attachment. The milking system may also be configured to carry out a milking-related action on the basis of a certain milk property. The increase in speed may be advantageous, in particular, if a property of pre-milk, in other words the first volume of milk, gives reason to carry out such a milking-related action. In this case, it is possible to configure the milking system to collect a larger volume of milk (pre-milk) in order to perform measurements in the measuring chamber, for example on the basis of health warnings in a database. The control unit may then be configured to measure the level of the milk in the measuring chamber and to emit a signal when a predetermined level is reached, which level may depend on the identity or another property of the animal to be milked. If desired, the first (pre-)milk may then be discharged by the milking system, for further tests, or to a sewer or pre-milk collection point.

It is also possible to take particularly quick action during the further course of a milking intervention if there is reason to do so. For example, if a milking cup is kicked off during a milking operation, the teat could have sustained an injury. After reattachment of the milking cup, there could then be blood in the milk. As this milk is not pre-milk, failure to signal blood in good time could lead to undesired contamination of the milk in the consumption milk tank. The milking system according to the invention is able to quickly anticipate this situation in an optimum manner. This embodiment also ensures that, in principle, all milk may be subjected to tests. However, it is also possible to conduct only a part of the milk, such as a proportional part, through the measuring chamber, and to conduct the remaining milk further outside the measuring chamber toward a milk jar or the milk tank.

In embodiments, the milking system comprises a milk line which connects the milking cup to a milk tank, wherein the measuring chamber is connected in a closable manner to the milk line by way of a sample line. An advantage of this embodiment is that the measurement is carried out only on a fraction of the milk, so that the milk flow is hindered as little as possible. Even if, for example, chemical substances are involved in a processing in the measuring chamber, or the milk is subjected to a test which is detrimental to the quality, the use of these substances or the loss of milk is as low as possible or necessary. It is also thus possible to collect data relating to a considerably large part of, or even the whole of, the milk of a milking operation using a single measurement, or at least fewer measurements. For instance, the fat content of the milk changes from low to higher during a milking operation. If the milking system is configured to direct a proportional part of the obtained milk toward the sample line, through a correspondingly configured valve device or the like, the (average) fat content of the milk as a whole may be determined using a single measurement.

In embodiments, the measuring chamber is the milk jar. In this embodiment, the measuring chamber forms a customary part of a robot milking device with the sensor devices. An advantage of this embodiment is that the milk flow is thus disrupted to a very limited degree. It is nevertheless also simple to ensure that all milk is measured, simply by virtue of the fact that all milk is first collected in said milk jar. It is then still possible to determine a progression over time of the value of a milking parameter or property, by virtue of the fact that this value may be determined in the entire milk jar, in other words at least in the part thereof in which milk is located. In the event that insufficient mixing occurs to result in a homogeneous entirety of milk, the measuring at different locations in the milk in the measuring chamber, in other words the milk jar in this case, provided by the invention offers a solution in that the local measured values can, for example, be averaged. However, if there is a sufficiently homogeneous volume of milk, the trend over time can be inferred from the timeline of the measured value, with account being taken of the inflow of milk (per unit time). For example, a parameter value of x in a volume V already milked changes through the inflow of a new volume of milk $\Delta V$ with its own parameter value x' to (x+$\Delta$x) in a new volume (V+$\Delta$V). In the simplest, linear case, the parameter value x' of the new milk volume $\Delta V$ which has flowed in is then equal to x+$\Delta$x(1+V/$\Delta$V). Of course, the required resolution will become ever greater, but comparable derivation methods will be clear to the person skilled in the art.

It is further noted in general here that the milking system comprises a milk destination device which is operatively connected to the sensor system, or at least the control unit thereof, and which is configured, on the basis of the value of the at least one milk property determined by the sensor control unit, to direct the associated obtained milk to one of a plurality of destinations. In such a case, the milk destination system comprises a plurality of discharge lines, at least one of which leads to a consumption milk tank, and at least one of which leads to a sewer or waste milk collection tank.

BRIEF DESCRIPTION OF THE DRAWINGS

The invention will be explained in more detail below by means of the attached drawing, which shows some embodiments exclusively for the sake of illustration and being non-limiting, and in which.

DETAILED DESCRIPTION OF THE INVENTION

Figure 1:
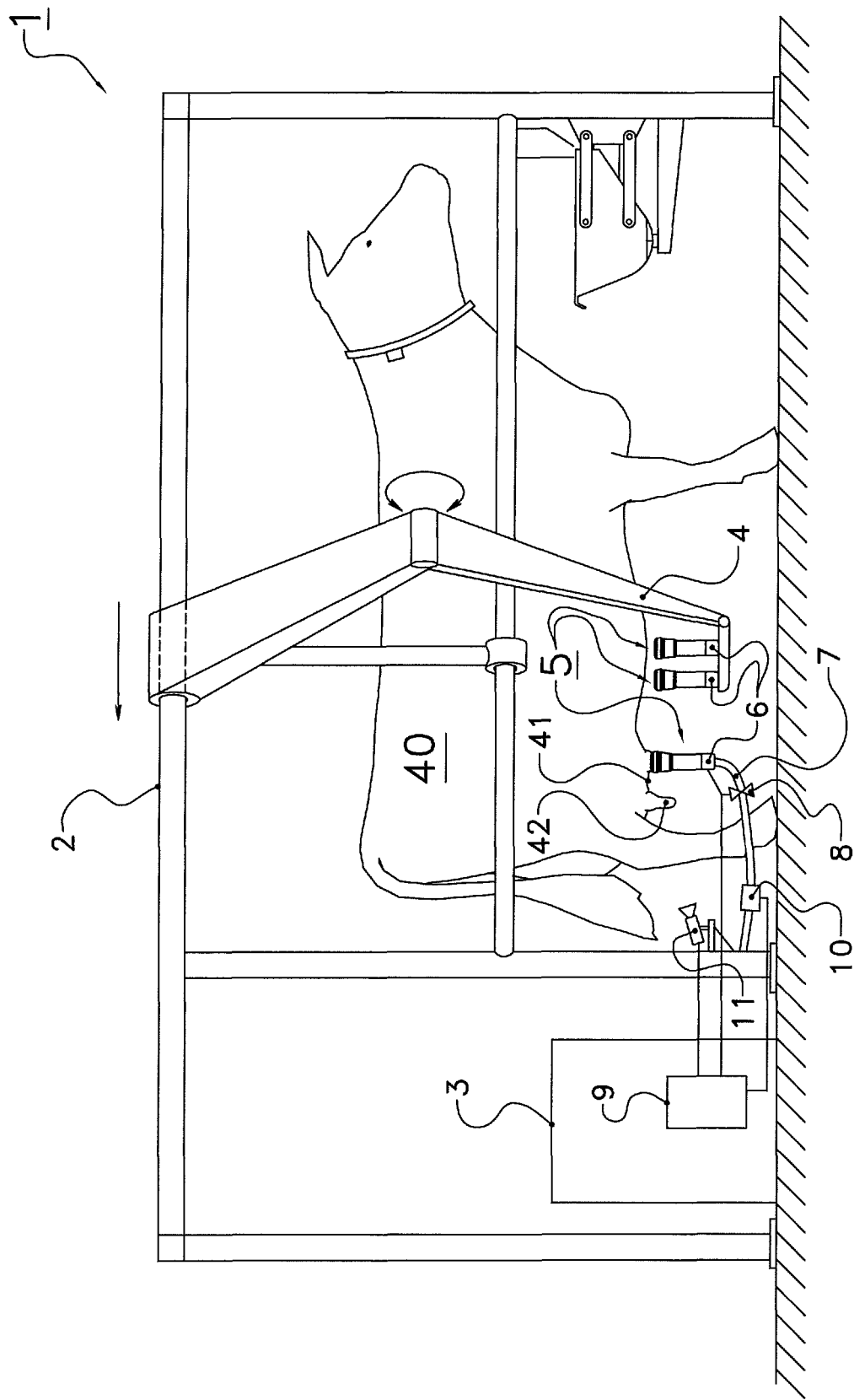
FIG. 1 shows a diagrammatic side view of a milking system according to the invention.

FIG. 1 shows a diagrammatic side view of a milking system 1 according to the invention. The milking system 1 comprises a milking stall 2 with a robot 3 having a robot arm 4, and also a milking cup 5 having a measuring chamber 6 and a milk hose 7 in which there is a valve 8. Reference numeral 9 denotes a control unit and reference numeral 10 denotes a milk hose milk flow meter. Reference numeral 11 denotes a camera.

Furthermore, reference numeral 40 denotes a dairy animal with an udder 41 and teats 42.

The illustrated milking system is a milking robot system, which can attach the milking cups 5 fully automatically to the teats 42 of a dairy animal 40, such as a cow. Nevertheless, the invention can likewise be applied to a conventional milking system, where the milking cups are connected to the teats by hand. In the illustrated robot milking system, parts which are not essentially important to the invention, such as a teat detection system and milk pump, are not shown.

The milking cup 5 comprises a measuring chamber 6 which ends in a milk hose 7. The milk hose 7 can be closed using a valve 8 which is under the control of a control unit 9. The milk hose milk flow meter 10 is arranged on the milk hose 7 downstream of the valve 8 in order to measure the milk flow through the milk hose 7 during milking. This milk hose milk flow meter 10 is connected to the control unit 9, and also to the camera 11. Said camera 11 may serve not only as an aid for determining the position of the dairy animal 40 or the teats 42, but in particular for determining a position of the milking cup 5 on the teat 42. Depending on the form of the udder and the teat 42, it may be the case that the milking cup 5 does not hang entirely vertically, but at an angle to the vertical. In addition, the camera 11 may also serve to determine the height of the milking cup 5 and optionally of the valve 8. This height/these heights may be important in determining the milk flow on the basis of the passage opening of the valve 8. All of this will be explained in more detail with reference to FIG. 2.

The milking chamber 6 shown here is rigidly connected to the milking cup 5. Advantageously, but not necessarily, each milking cup 5 comprises such a measuring chamber 6. The necessary measurements may thus be performed for each quarter of the udder. It is also possible to provide the measuring chamber, with the sensor device according to the invention, elsewhere or in a different manner. For example, the measuring chamber is provided in or as the milk jar (not shown here) of the milking system. Milking robots, in particular, nearly always have a milk jar (or other buffer vessel) for collecting the milk from a milking operation. Based on assessment of the obtained milk, using one or more measurements, which take some time, the control unit subsequently decides which destination the milk must be assigned: consumption milk, colostrum, waste milk, etc. By providing the sensor device in the milk jar, the measurements may be performed for the entire milk yield. It is further possible to provide a sample chamber of a sampling device as the measuring chamber 6. In this case, a sampling device takes a milk sample from a milk line, for example the milk hose 7 for each milking cup 5, or a joint milk line downstream of a milking claw for four milking cups at the same time, or even further along in the milking system. For such a milking system having a sampling device, the present invention also offers many, if not all of the said advantages.

Figure 2:
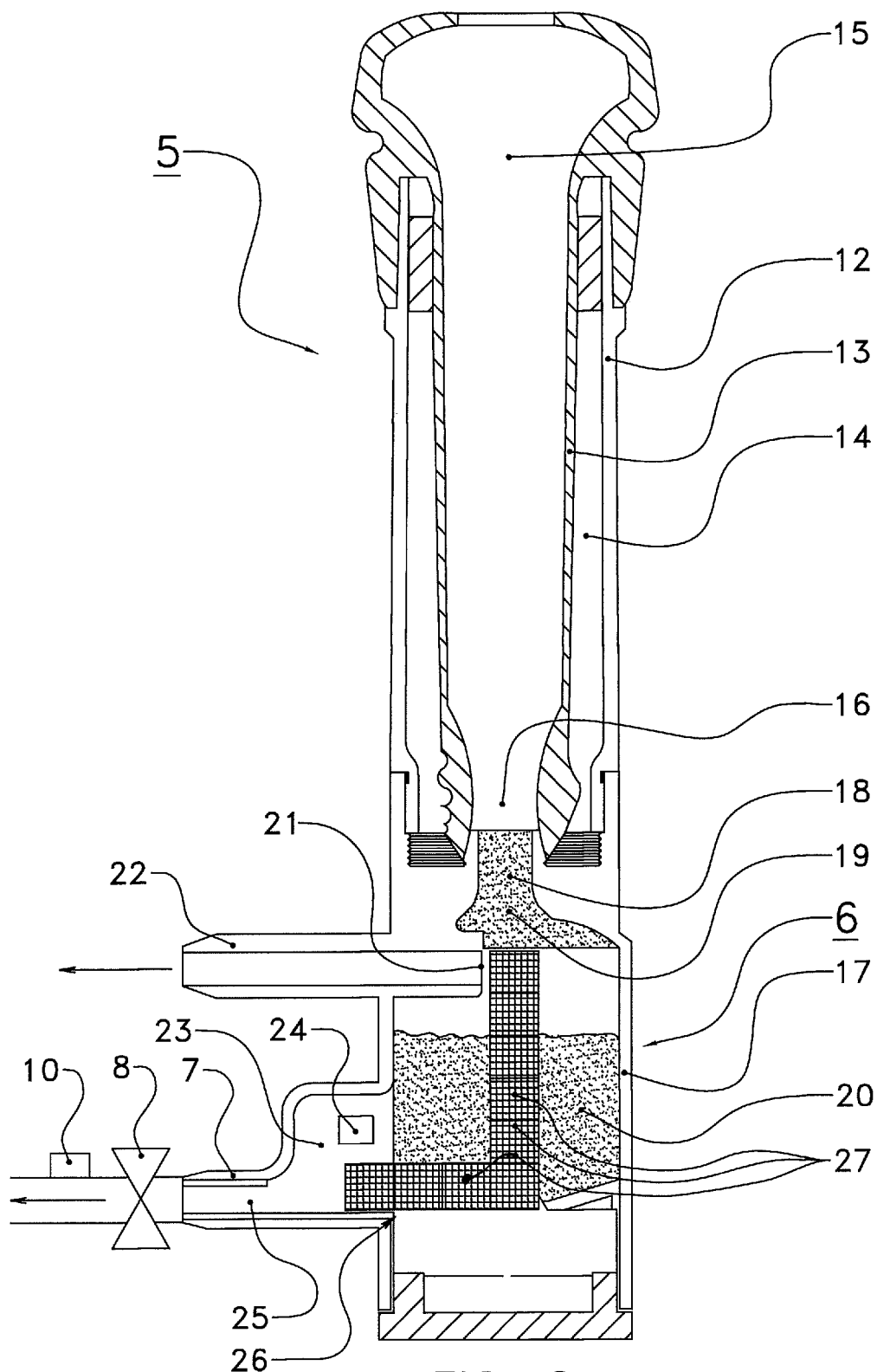
FIG. 2 shows a diagrammatic cross section of part of a milking system according to the present invention.

FIG. 2 shows a diagrammatic cross section of part of a milking system according to the present invention. In this figure, similar parts are denoted by the same reference numerals.

The milking cup 5 comprises a cup casing 12 and a lining 13, enclosing a pulsation space 14 between them. In the lining, there is a teat space 15 which ends in a first milk outflow opening 16. A housing 17 for the measuring chamber 6 forms a rigid unit with the milking cup 5. The first milk outflow opening 16 opens (almost) directly into the milk inlet 18 which is connected to the measuring chamber 6 via a convex outflow 19. In this case, there is milk 20 in the measuring chamber 6. Above it, a vacuum line 22 is connected via a vacuum outlet 21. Reference numeral 23 denotes a measurement constricted section, on which is an alternative sensor location 24. The measurement constricted section 23 ends in the milk hose 7, via the second milk outflow opening 25.

Reference numeral 26 denotes a sensor system which comprises a series of optical sensor devices 27. The optical sensor devices 27 are in this case provided in an L shape, and each comprise an array of picture elements, or pixels (not shown in detail here). The pixels may be either generally light-sensitive or specifically color-sensitive, such as red-sensitive, green-sensitive or blue-sensitive, thus forming an RGB sensor or chip. If desired, the sensor element may be supplemented with (near-) infrared-sensitive pixels. It is important to note that each sensor device 27 is able per se to measure one or more milk properties locally, of course if necessary in cooperation with the control unit for processing the signals. All of this will be explained in more detail below.

In embodiments, the milking system according to the invention comprises the illustrated rigid combination of a milking cup 5 and a housing 17 with the measuring chamber 6. The milk obtained from the teat in the teat space 15 flows to the measuring chamber 6 via the first milk outflow opening 16 and the milk inlet 18 directly via the outflow 19. Advantageously, optical sensors/sensor elements and one or more light sources may also be located at this outflow, for example around the outflow in a ring shape. A milking system equipped in such a way may, for example, count milk jets by interrupting a light beam, by changing reflection on the milk, etc. The convex form of the outflow 19 and the resulting Coandă effect will also mean that the incoming milk will for the most part "adhere" to the wall of the housing 17, thus resulting in minimal foaming. Partly as a result thereof, a volume of single-phase milk 20 will in principle be formed at the bottom of the measuring chamber 6, with only air being present in the space above. This air, although it is under a lower than atmospheric pressure, can be extracted via the vacuum outlet 21 and the vacuum line 22, which are connected to a vacuum system of the milking system which is not illustrated in detail here. In principle, the pressure will correspond to a normal milk vacuum, such as around 40 kPa.

The housing 17 of the measuring chamber 6 and the cup casing 12 of the milking cup 5 form a rigid unit here. The direct connection offers the advantage of a more direct measurement of milk from the dairy animal. Here, the measurement constricted section 23 is, for example, a narrowed part of the measuring chamber, with two (approximately) parallel walls which may be permeable to light or other radiation or fields. This is of course relevant if the optical sensor device is located outside the measuring chamber. It should be noted that a measurement constricted section 23 is not necessary if the optical sensor device is located in the measuring chamber 6.

The obtained milk is (temporarily) collected in the measuring chamber 6, wherein the milk level will begin to rise at the start of the milking. The level of the milk 20 in the measuring chamber 6 may, as a first parameter of the milk, be measured using an optical sensor system 26. In the illustrated embodiment, this comprises a series of optical sensor devices 27 which extend over the height of the measuring chamber 6. The highest optical sensor device 27 which exhibits a signal that satisfies a predetermined criterion, such as a measured transmission above a threshold value, indicates the level of the milk 20.

The optical sensor system 26 is in operational connection with the control unit 9 (not shown here) and transmits a signal related to the measured milk height. The control unit 9 is also connected to the controllable valve 8. The size of the passage opening of the valve 8 is determined by the control unit on the basis of the measured milk level. If the milk level in the measuring chamber 6 rises, at least to above a desired value, then the milk flow has evidently increased. In order to compensate for this by means of a milk outflow of an (approximately) equal size through the second milk outflow opening 25, the control unit will open the valve 8 further. By contrast, if the milk level falls, the control unit will close the valve further. This achieves a milk level in the measuring chamber 6 which is substantially as constant as possible.

An advantage of this, for example, is that the measurement constricted section 23 connected to the measuring chamber 6 and the second milk outflow opening 25, or at least the part of the measuring chamber around which the optical sensor system 26 is arranged, can always be kept entirely submerged in milk but also continuously flowed through by fresh milk. A very reliable measurement of milk properties can thus be ensured.

The optical sensor system 26 may sometimes measure an incorrect height of the milk 20 in the measuring chamber 6, for example if the sensor 26 is located along a wall of the measuring chamber 6 and said wall is at an angle to the vertical, such as when attaching the milking cup 5 to a slanted teat. In order to correct for this, it is possible to use an inclination sensor, such as the camera 11 from FIG. 1. This can ascertain whether the milking cup with the housing 17 of the measuring chamber 6 is at an angle from the vertical and, if so, can ascertain this angle using image-processing software suitable for this purpose. The angle thus obtained can be transmitted to the control unit 9 which can use this to determine the correct height of the milk in the measuring chamber 6 according to simple geometric formulas.

An important variable during milking is the milk flow. The milk flow can be determined in a very simple way on the basis of the height of the milk 20 in the measuring chamber 6 and the size of the passage opening of the valve 8. Where the conditions remain otherwise unchanged, in particular the pressure difference between the vacuum in the top part of the measuring chamber 6, in other words in the vacuum line 22, and the vacuum which prevails in order to discharge the milk through the milk hose 7, the milk flow can be simply calculated using hydrostatic equations. Thus, the control unit 9 from FIG. 1, together with the optical sensor system 26 and the valve 8, could serve as a milk flow meter. In this case, it is assumed that the liquid in the measuring chamber is not a milk/air mixture but substantially pure milk, which is an advantage achieved according to the invention. Nevertheless, it is also possible, in addition to the alternative of calibration measurements, to make this calculation of the milk flow more reliable. To this end, for example, a vacuum sensor may be provided (not shown here) in the vacuum line 22, but it may also be provided in, for example, the top part of the measuring chamber 6. The (milk) vacuum prevailing there, and also the prevailing milk transport vacuum, which is determined by the milking system and can likewise be measured further along the milk hose, determine, together with the height of the milk column, the pressure difference over the passage opening of the valve 8, and thus the volume of the milk flow.

Another variable which can influence the calculation of the milk flow is the height of the milk column above the valve 8. In the diagrammatic representation of FIG. 2, this will be able to be approximately constant, independently of the height at which the milking cup 5 is connected to a teat. However, as the valve 8 may also be located much further along the milk hose 7, for example a meter or more, it may be the case that the height of the milk column above the valve can vary greatly depending on the height of the teats of the dairy animal. In order to be able to take into account this height, it may be advantageous to use, for example, the camera 11 from FIG. 1 to determine the height of the milking cup and/or of the valve 8. From the height difference, it is in particular possible to determine a difference in height of the milk column, which fills the measuring chamber up to and including the part of the milk hose 7 up to the valve 8. It should be noted here that the teat height is a property of the animal, which may also be stored and searched for in the control unit 9 of the milking system. In this case, it is assumed that the resulting position and form of the milk hose, and thus the height difference between the measuring chamber 6 and the valve 8, is substantially constant during each milking operation of said dairy animal. In this case, other measurement methods and sensors for determining and taking into account this height difference are not ruled out.

It is also possible to provide an additional milk flow meter, in particular a milk hose milk flow meter 10. In FIG. 2, this is located downstream of the valve 8, but could also be between the measuring chamber 6 and the valve 8. As the milk flow is a single-phase system at the location of the milk hose milk flow meter 10, a great variety of different meters may be used, in particular including very simple and reliable meters. An example of this is a milk flow meter on the basis of the magnetohydrodynamic principle, which has the advantage that it can measure the milk flow in an entirely contactless manner.

The optical sensor system 26 is not only configured to measure the height of the milk 20 in the measuring chamber 6 but also one or more other milk properties. For example, the optical sensor devices 27 determine a color of the milk, by measuring incident and reflected light, or absorbed/transmitted light. To this end, either an external light source may be used, or a light source provided in the milking system for this purpose, the latter offering the advantage of better controllability and higher intensity owing to the smaller distance. These are not illustrated here, but will be explained in more detail below. The color can be determined locally for each sensor device 27, with it being possible to ignore a measurement above the level of the milk. By evaluating all of the measured colors, it is possible to reach a conclusion about the entire milk. For example, a single measurement of a slight red discoloration, which is not repeated in any other optical sensor device 27, could be considered to be a false positive red measurement, meaning that the milk does not have to be rejected after all. The measurement can thus be more reliable than when a single sensor determines a value for the entire milk.

In this way, a color gradient may also be recognized, such as resulting from supernatant milk foam, or an inhomogeneous layer of milk. In addition, deviations such as milk containing blood, which is colored more strongly red than consumption milk, may be recognized. The milking system may also be configured to direct the obtained milk to a predetermined destination on the basis of such deviations, such as to a sewer in the case of milk containing blood. The steering means suitable for this purpose, such as valves and the like, are not illustrated here.

The sensor device may also be configured to measure a whole or partial spectrum, in other words a series of values for the intensity of the reflected, transmitted or scattered light in two or more wavelength regions. On the basis of such a spectrum, more conclusions can be drawn than with a single value, for example only red, as discussed above. If, for example, the (standard) red, green and blue wavelength regions of an RGB chip are selected, conclusions can also be drawn about contents of fat and/or protein of the milk 20. To this end, the pixels of the optical sensor devices 27 may be correspondingly sensitive, for example using suitable color filters. Reference is made, inter alia, to EP1000535A1 and the article "Visible and near-infrared bulk optical properties of raw milk" by Aernouts et al. in J. Dairy Sci. 98:6727-6738. It should also be noted here that, with the aid of calibration measurements, a self-learning milking system can be provided, which can improve the more measurements it performs. It is also possible to increase the amount of data in another way. For example, an NIR-sensitive element can be added to the RGB chip, so that the number of wavelength regions increases. An example of such a system is the AfiLab system from Afimilk. It is also possible, instead of or in addition to the standard RGB regions, to measure more wavelength regions, by providing correspondingly sensitive optical sensor (sub-) elements/pixels having suitable filters or the like. Ideally, the optical sensor devices 27 are or comprise spectrometers for determining an optical and/or NIR spectrum (in absorption and/or transmission and/or scattering) of the milk, advantageously locally. The control unit is then advantageously configured to locally determine a milk property comprising a content of fat, protein, carbohydrates (lactose) or the like. On the basis of these locally collected values of the one or more milk properties, it is then possible for the control unit to give an improved, i.e. more accurate and/or more reliable, value for this milk property (or these milk properties) of the milk as a whole.

Another advantage of the local determination of values of milk properties is that it is possible to follow the progress through the measuring chamber. For example, the optical sensor system 26 is configured to detect particles. This is explained in more detail below. Of importance here is that such a particle enters the measuring chamber and, for example, is detected at the top, in a top layer of the milk 20 by a top optical sensor device 27. The particle will move through the measuring chamber 6 and ultimately leave it via the second milk outflow opening 25, and in doing so will move past respectively different optical sensor devices 27 of the optical sensor system 26, in order to be detected there. If such a detection is repeated at all or at least a predetermined number of sensor devices 27, the detection may be considered to be reliable. Furthermore, it is thus possible to determine a speed of the milk in the measuring chamber, by dividing the distance between the respective sensor elements and the time difference of the associated detection. It is thus also possible to determine a value of the content of particles or flakes in the milk, on the basis of which it can be concluded that mastitis is present if that number exceeds a predetermined limit for the number of particles.

Figure 3:
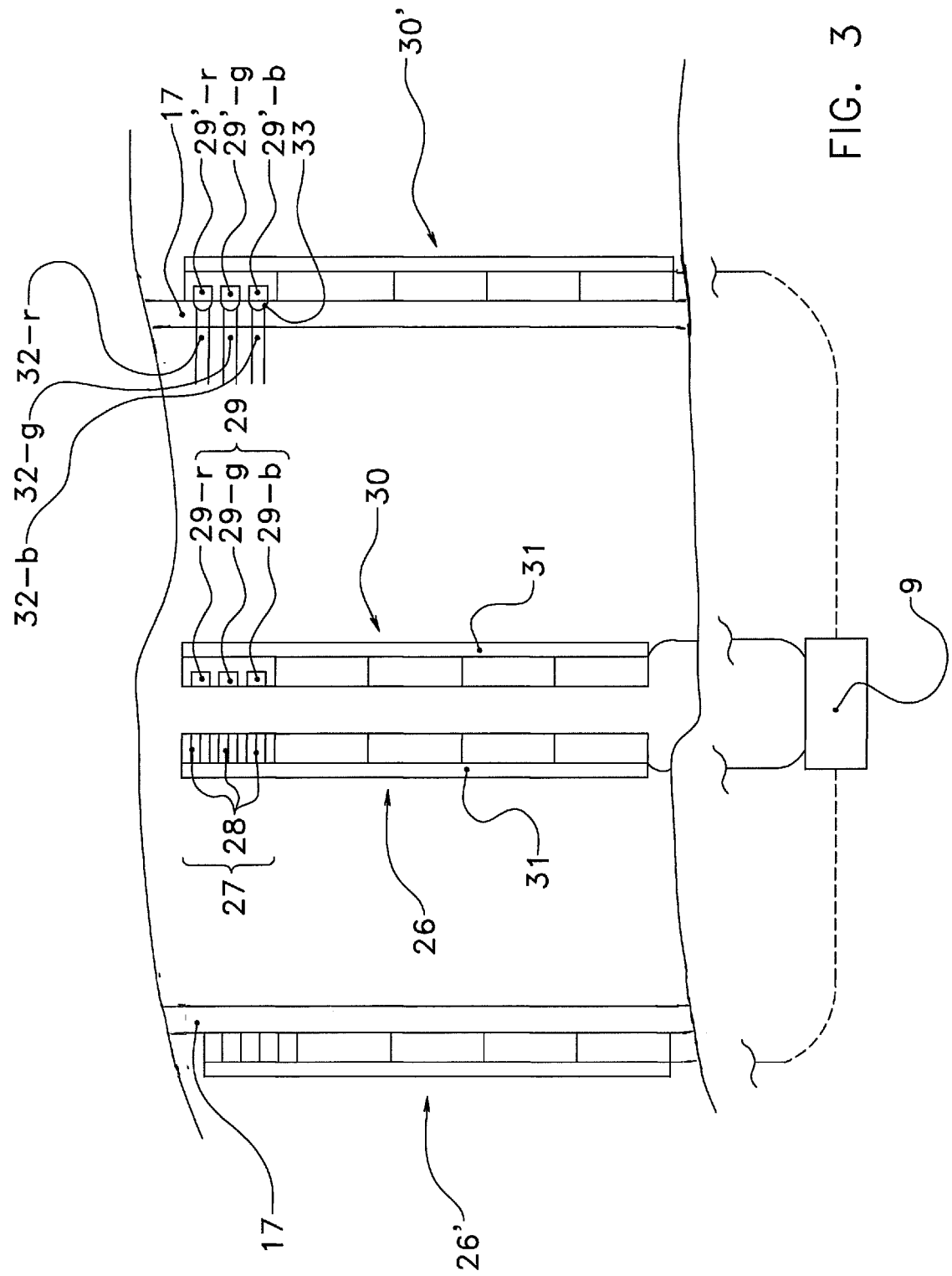
FIG. 3 shows a partial cross section of a detail of a milking system according to the invention.

FIG. 3 shows a diagrammatic partial cross section of a detail of a milking system according to the invention. In this figure, reference numeral 17 is the housing of the measuring chamber, or at least a wall thereof. Inside the housing is an optical sensor system 26 with optical sensor devices 27, each of which comprises a plurality of pixels, and which are provided on a printed circuit board (PCB). Reference numeral 30 denotes a light source, which comprises a plurality of part light sources 29 each having a plurality of LEDs 29-r, 29-g, 29-b, and which are provided on a printed circuit board 31 (PCB). The printed circuit boards 31, and thus the sensor system 26 and the light source 30, are operatively connected to the control unit 9.

Furthermore, alternative positions for the sensor device and light source are provided, in the form of sensor system 26' and light source 30', which are both arranged outside the housing 17 of the measuring chamber instead of inside. In the case of the alternative light source 30', a series of collimators 33 is further provided, which ensure that the LEDs 29'-r, 29'-g and 29'-b respectively emit more or less parallel light beams 32-r, 32-g and 32-b.

In the arrangement with sensor 26 and light source 30, it will be clear that at least a part of the milk is located between the two, and this part is measured for its optical properties. An advantage of this arrangement is that the optical path length is relatively small, and the absorption in the milk which, seen specifically, is relatively high is not so large that it is not possible to take accurate measurements. On the other hand, all this is more susceptible to soiling by encrusted milk residues, and is also more difficult to replace, in respect of which the alternative sensor 26' and/or light source 30' offer better opportunities.

The construction of (each of) the sensor devices 27 is with a series of sub-sensors 28, such as at least 3 pixels (red, green and blue). Alternatively, two or more light-sensitive elements such as photodetectors may be provided, or also more and/or other pixels, such as (near-)infrared-sensitive pixels, or also a plurality of groups of pixels, such as in a CCD-camera-like optical sensor device 27. There are five of such sensor devices 27 provided here one above the other in the vertical direction. In the horizontal direction, this number is undetermined in the figure, and is, for example, one or more. Irregular arrangements are also possible, as in FIG. 2. Any other plural total number of sensor devices 27 is possible.

The number of part light sources 29 in the light source 30 is likewise five here in the vertical direction, in other words equal to the number of sensor devices 27. This offers advantages in terms of the mutual comparability of the measurements. Nevertheless, a smaller or larger number of part light sources 29 is readily possible.

The collimators 33 are provided for focusing light emitted by the LEDs 29' into beams 32-r. 32-g and 32-b. Such beams improve the link between light source and sensor element even further, and such light beams are in particular suitable for measuring scattering of light, which is in turn useful for measuring particles in the milk. All of this will be explained in more detail below.

Figure 4:
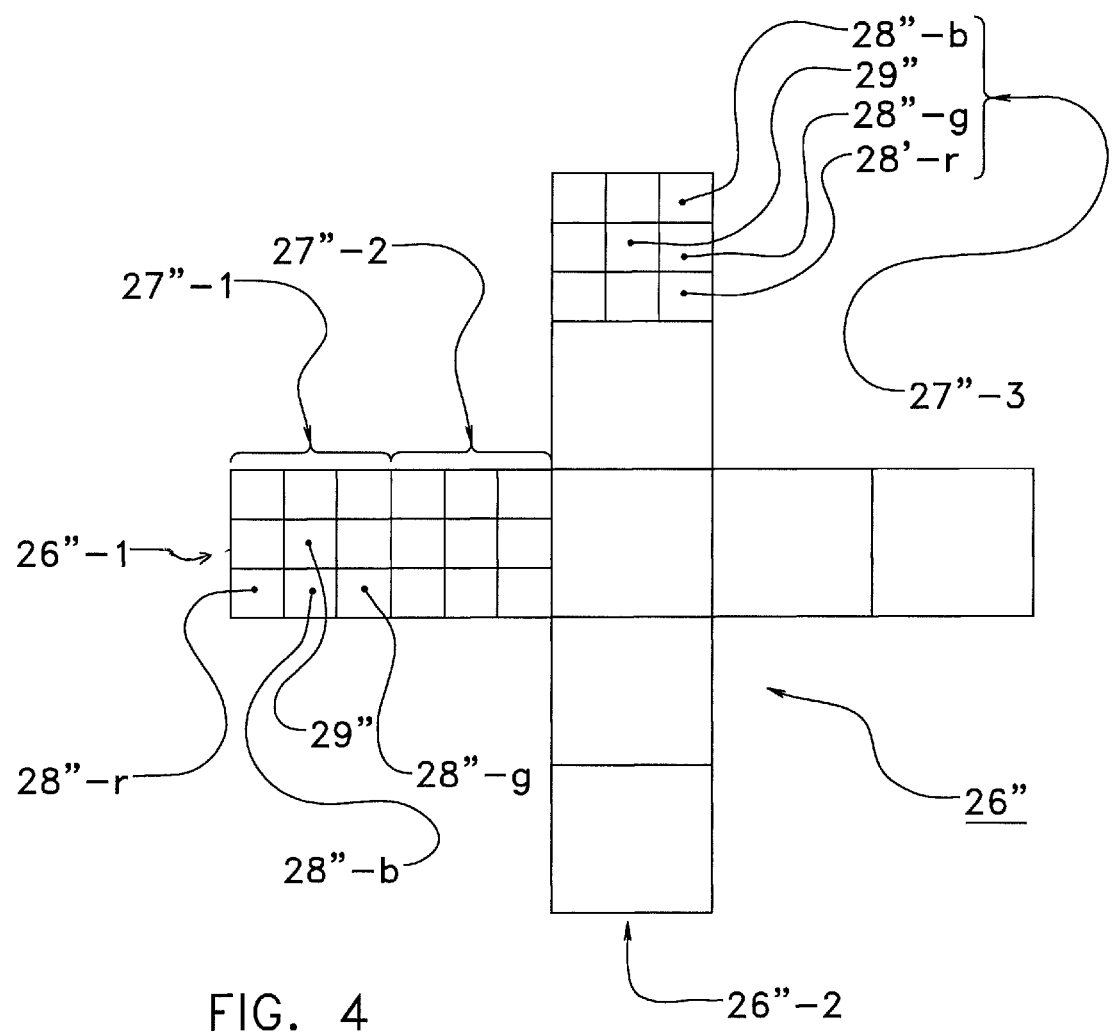
FIG. 4 shows a diagrammatic side view of an alternative optical sensor system 26"

FIG. 4 shows a diagrammatic side view of an alternative optical sensor system 26". These branches 26"-1 and 26"-2 are at a distance from one another, comparable to parts 26 and 30 in FIG. 3. The milk may be located between them. The sensor system 26" comprises two parts 26"-1 and 26"-2 arranged crosswise, each having five optical sensor devices 27"-1, 27"-2, 27"-3, etc., which in this case each comprise nine sub-elements arranged in a 3×3 array. These sub-elements comprise in each case a central white-light LED 29" and alternating RGB pixels 28"-r, 28"-g and 28"-b surrounding it.

Many different measurement combinations are possible using such a crosswise arrangement, between different LEDs and different pixels, thus for different colors and also for different wavelengths as a result of the crosswise arrangement. By actuating or reading out, respectively, the different LEDs and/or pixels in a coordinated manner, the control unit can thus collect a large amount of data, on the basis of which the control unit can very reliably and accurately determine the associated milk properties. The control unit is then advantageously configured accordingly. It should be noted that other arrangements are also possible, such as all part light sources on one branch 26"-1, optionally white-light LEDs, differently colored LEDs (visual, (N)IR) or other light sources, and all light-sensitive elements, such as RGB chips, photodetectors, etc., on the other branch 26"-2. In addition, the branches 26"-1 and 26"-2 do not each have to have five elements, but any number is suitable, and they also do not need to be at a right angle, but may be at any desired angle.

Figure 5A:
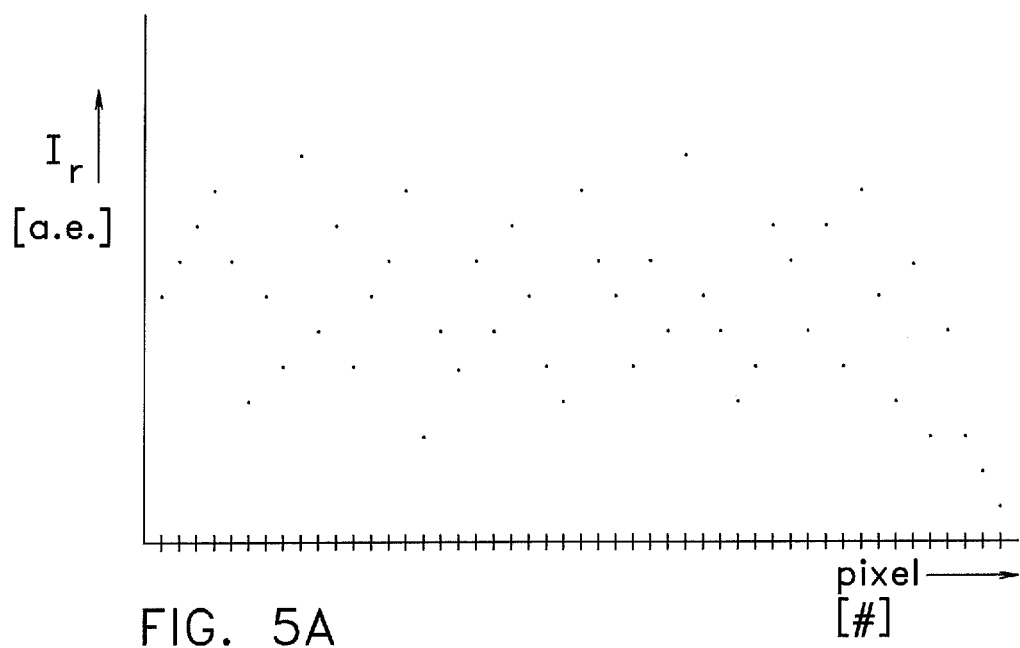
FIGS. 5a and 5b show diagrammatic views of a series of measured values and a further processing thereof.
Figure 5B:
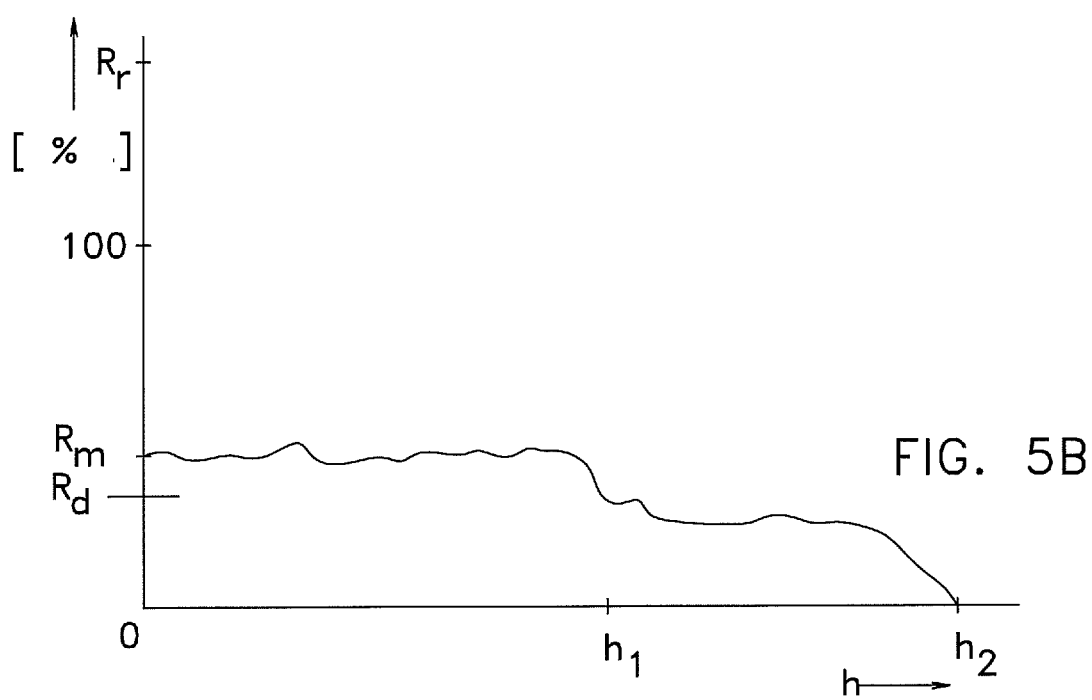

FIGS. 5a and 5b show diagrammatic views of a series of measured values and a further processing thereof.

FIG. 5a shows example measured values of intensity of light emitted by the LEDs 29" of the second branch 26"-2, measured by sub-sensors/pixels 28" in said second branch 26"-2. The intensity values measured by the different pixels are plotted for each pixel, and these comprise red, green and blue intensity values. It can be seen that there is a plurality of measured intensity values, each of which, or even as a whole, does not yet reveal much in this case without further explanation. However, the control unit is configured to process these values into milk property values.

FIG. 5b shows an example of a processed set of intensity values, specifically looking at the intensity values as measured by only the red pixels 28"-r in the second branch 26"-2, converted to a reflection percentage and plotted against the height at which the relevant red pixels are located in the measuring chamber. It can be seen that for a height between 0 and h, the reflection Rm is above a predetermined threshold Rd. That indicates that the milk is redder than this threshold value, which suggests that the milk contains blood. The control unit can subsequently direct the relevant milk to a sewer or other depository not intended for consumption milk. The control unit may also be configured to generate an associated alarm signal, for example to warn an operator or for recording in a logbook. It can also be seen that the reflection value is lower between $h_1$ and $h_2$. The control unit can infer from this that the milk level is $h_1$, and that milk foam is present between the heights $h_1$ and $h_2$. On this basis, the control unit can deduce a milk speed, as is described in more detail in the introductory part of the description.

In addition, the measured intensity value for the different colors, or the wavelengths, can be used by the control unit to determine a fat content, protein content, and/or carbohydrate (lactose) content, for example on the basis of the findings in the above-mentioned article by Aernouts et al. (l.c.), or the article "Visible and near-infrared spectroscopic analysis of raw milk for cow health monitoring: Reflectance or transmittance?" by Aernouts et al., J. Dairy Sc. 94: Pages 5315-5329. If desired, other measurements may be involved in this, such as the scattering values described for FIG. 3 and below for FIG. 6, and a plurality of or different wavelength regions may be measured, in particular in the infrared. Suitable LEDs and/or other sources, and also suitable optical (sub-)elements (pixels with suitable filters) are then provided. Moreover, it is possible to compare the measured values with the contents of fat, protein, lactose and the like as measured in a laboratory or dairy factory in a sample or bulk batch of the milk. On the basis of such comparisons with reference values, the control unit can use machine learning to develop ever more accurate algorithms. It should be noted here that it is not always important to have very reliable absolute values, which is not simple using some wavelength regions. Sometimes it is also sufficient to be able to detect a reliable trend over time in one or more contents, without knowing an absolute value. The milking system according to the invention and the associated method may be suitable for this purpose.

Figure 6A:
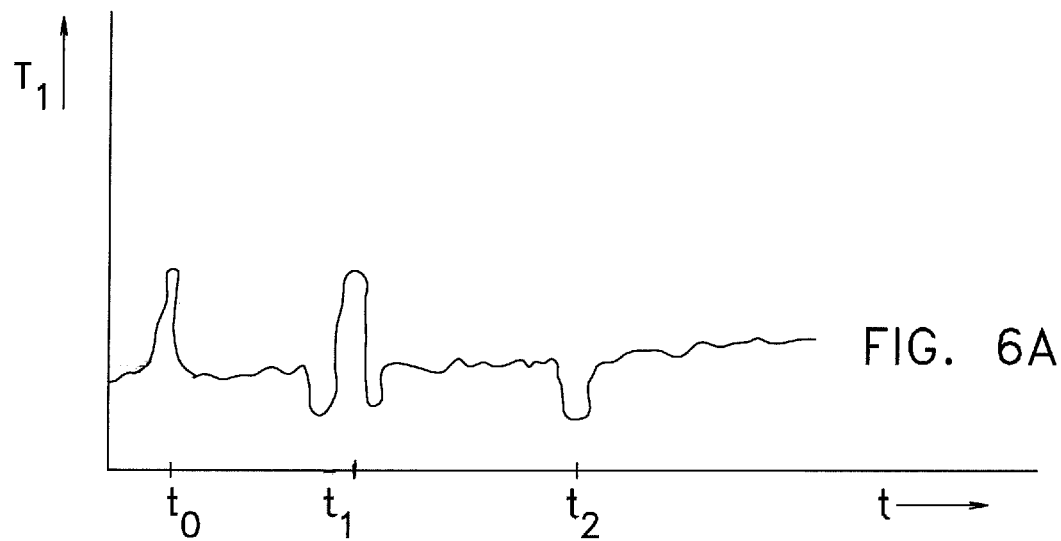
FIG. 6a and FIG. 6b show a timeline of respective transmission values for two different sensor elements.
Figure 6B:
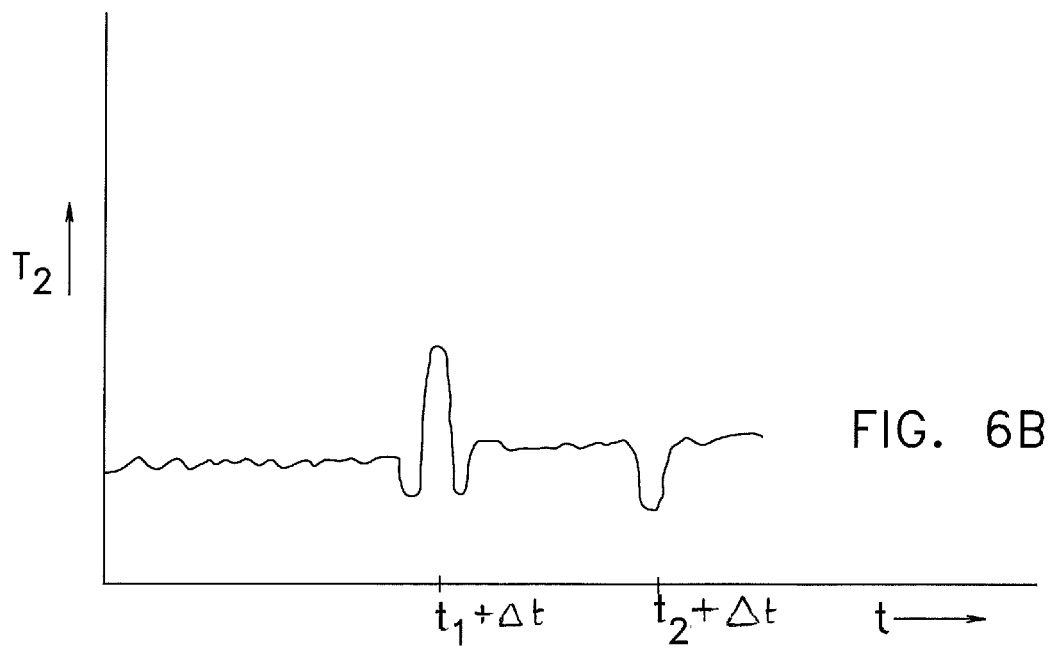

FIG. 6a and FIG. 6b show a timeline of a transmission value $T_1$ and $T_2$, respectively, for two different sensor elements.

Such a transmission value may, for example, be measured using the arrangement from FIG. 3, with the part light sources 29' and collimators 33, which emit respective light beams 32, and which are measured using optical (sub-) elements of the sensor system 26' situated on an opposite side of a measurement constricted section or the measuring chamber. In this case, for example, $T_1$ is measured by an optical sensor sub-element situated at the top of the sensor system 26', whereas $T_2$ is measured by a sensor sub-element situated at the bottom of the sensor system 26.

If a flake, air bubble or other particle moves into an emitted beam, it will scatter, absorb and/or focus the light in the beam. This is noticeable in the measured signal. For instance, $T_1$ exhibits a peak at time $t_0$, a ripple with peak at time $t_1$, and a trough in the signal at time $t_2$. In principle, the control unit could conclude from this that at to a light-concentrating particle is passing by, at time $t_1$ an air bubble is passing by, which scatters light (as a result of which the intensity falls) but also partially focuses light (and at that moment the intensity then increases), and at time $t_2$ a scattering and/or absorbing particle is passing by. It should be noted here that the precise behavior and certainly the absolute values are highly dependent on the properties of the particle, such as dimension and composition. Nevertheless, it is generally possible to reach a conclusion about the character by taking the above into consideration. In practice, however, it is not simple to reliably detect a particle and to qualify it. It helps to have at least a second measurement, in this case in the form of the measurement $T_2$, which takes place further along in the flow direction of the milk, which points downward (at least in the arrangement of FIG. 2). The $T_2$ diagram shows that at time $t_1+\Delta t$ and $t_2+\Delta t$ the signals in $T_1$ at $t_1$ and $t_2$, respectively, are repeated. This indicates that both measurements are correlated and associated with actual particles. These, in principle redundant, measurements thus increase the reliability of the detection of particles. However, it can also be seen that the signal in $T_1$ at $t_0$ is not repeated in $T_2$. Although this does not necessarily have to mean that there was no particle, the chance that this was a mastitis flake is small. Thus, by looking at both the nature of the signal (trough, peak or ripple) and the repetition in another location, mastitis-related particles/flakes can be detected more reliably. Since it is additionally possible to measure the milk flow, at least the volume at any moment, the density of such particles in the milk may also be determined by the control unit. On the basis of the particle density detected by the control unit, the control unit can emit a signal relating to "mastitis yes/no", such as an alarm signal or a signal that directs the milk in question to a destination other than the consumption milk tank.

Furthermore, it is possible for the control unit to determine the milk speed from the measured signals. After all, the correlated signals at $t_1$ and $t_1+\Delta t$ and at $t_2$ and $t_2+\Delta t$, respectively, cover a known distance $\Delta x$ (distance between the relevant detectors/part light sources) over time $\Delta t$. The speed is then simply $\Delta x/\Delta t$. Although this speed may vary for different particles owing to vortices in the milk, an average thereof will be a good indication of the speed of the milk through the measuring chamber. From this, together with the milk height or the cross-sectional area of the second milk outflow opening, the control unit may simply determine the flow rate of the milk, and from this in turn the total volume of milk.

The invention claimed is:

1. A milking system for milking a dairy animal, comprising:
a milking cup for obtaining milk; and
a measuring chamber which is in flow communication with the milking cup for at least temporarily containing the obtained milk, and having a sensor system arranged therein or thereon for measuring at least one property of the milk present in the measuring chamber,
wherein the sensor system comprises
at least three optical sensor devices, each configured to measure values of a property of the milk present in the measuring chamber, and
a sensor control unit for actuating the sensor system and for processing the measured values, wherein the sensor control unit is configured to repeatedly select one of the at least three optical sensor devices in a targeted manner, wherein at least two of the at least three optical sensor devices are identical,
wherein the sensor system is configured (1) to, using each of the at least three optical sensor devices when selected, measure a local value of the property of the milk at a location of the selected optical sensor device using the selected optical sensor device, and (2) to determine a value of the at least one property of the milk in the measuring chamber on a basis of the local values measured locally by the at least three optical sensor devices, the determined value of the at least one property of the milk being a property other than a height of the milk in the measuring chamber,
wherein the sensor system is further configured to determine a height of the milk in the measuring chamber depending on the local values measured by the at least three optical sensor devices and on heights of the at least three optical sensor devices in the measuring chamber, and
wherein the measuring chamber is rigidly connected to the milking cup.

2. The milking system as claimed in claim 1, wherein the measuring chamber is free of homogenization means in the measuring chamber.

3. The milking system as claimed in claim 1, wherein the at least three optical sensor devices are distributed over the measuring chamber.

4. The milking system as claimed in claim 3, wherein the at least three optical sensor devices are distributed over a height of the measuring chamber.

5. The milking system as claimed in claim 1, wherein the at least three optical sensor devices are all identical optical sensor devices.

6. The milking system as claimed in claim 1 wherein at least one of the at least three optical sensor devices comprises a plurality of optical sub-sensors.

7. The milking system as claimed in claim 6, wherein each optical sub-sensor is or comprises an RGB chip or an RGB-IR chip.

8. The milking system as claimed in claim 1, wherein the sensor system further comprises at least one light source.

9. The milking system as claimed in claim 8, wherein the sensor system comprises at least one light source for each of the at least three optical sensor devices.

10. The milking system as claimed in claim 8, wherein the at least one light source is a broadband light source.

11. The milking system as claimed in claim 1, wherein a first milk property, which is not a height, is or comprises a color or absorption spectrum of the milk.

12. The milking system as claimed in claim 1, wherein a first milk property, which is not height, is or comprises an occurrence or concentration of flakes and/or other particles in the milk that satisfy a predetermined optical criterion.

13. The milking system as claimed in claim 1, wherein the measuring chamber further comprises a milk discharge opening and a valve device having a controllable passage opening and a valve control unit for controlling the valve device, and
wherein the valve control unit is operatively connected to the sensor control unit and is configured to control the passage opening on a basis of the measured value of the height of the milk in the measuring chamber.

14. The milking system as claimed in claim 13, wherein the valve control unit is operatively connected to the sensor control unit and is configured to control the passage opening on a basis of the measured value of the height of the milk in the measuring chamber in such a way that the height of the milk in the measuring chamber is kept constant as far as possible.

15. The milking system as claimed in claim 1, wherein the milking system further comprises a milk line which connects the milking cup to a milk tank, and
wherein the measuring chamber is connected in a closable manner to the milk line by way of a sample line.

16. The milking system as claimed in claim 1, wherein the measuring chamber is a milk jar.

17. The milking system as claimed in claim 1, wherein the at least three optical sensor devices are in a row.

18. The milking system as claimed in claim 1, wherein the measuring chamber is rigidly connected to the milking cup in a unitary manner.

19. The milking system as claimed in claim 1, wherein a housing of the measuring chamber and a casing of the measuring cup form a rigid unit.

20. A milking system for milking a dairy animal, comprising:
a milking cup for obtaining milk; and
a measuring chamber which is in flow communication with the milking cup for at least temporarily containing the obtained milk, and having a sensor system arranged therein or thereon for measuring at least one property of the milk present in the measuring chamber,
wherein the sensor system comprises
at least three optical sensor devices, each configured to measure values of a property of the milk present in the measuring chamber, and
a sensor control unit for actuating the sensor system and for processing the measured values, wherein the sensor control unit is configured to repeatedly select one of the at least three optical sensor devices in a targeted manner, wherein at least two of the at least three optical sensor devices are identical,
wherein the sensor system is configured (1) to, using each of the at least three optical sensor devices when selected, measure a local value of the property of the milk at a location of the selected optical sensor device using the selected optical sensor device, and (2) to determine a value of the at least one property of the milk in the measuring chamber on a basis of the local values measured locally by the at least three optical sensor devices, the determined value of the at least one property of the milk being (a) a color, (b) an absorption spectrum of the milk, or (c) an occurrence or a concentration of flakes and/or other particles in the milk that satisfy a predetermined optical criterion,
wherein the sensor system is further configured to determine a height of the milk in the measuring chamber depending on the local values measured by the at least three optical sensor devices and on heights of the at least three optical sensor devices in the measuring chamber, and
wherein the measuring chamber is rigidly connected to the milking cup.

\* \* \* \* \*